United States Patent [19]
Beldham

[11] Patent Number: 5,390,385
[45] Date of Patent: Feb. 21, 1995

[54] LAUNDRY MANAGEMENT SYSTEM FOR WASHING MACHINES

[75] Inventor: Paul M. Beldham, El Toro, Calif.

[73] Assignee: Knight Equipment International, Costa Mesa, Calif.

[21] Appl. No.: 68,761

[22] Filed: May 28, 1993

[51] Int. Cl.⁶ .................... D06F 33/02; D06F 39/02
[52] U.S. Cl. ........................ 8/158; 68/12.18; 68/12.27; 68/17 R; 68/27
[58] Field of Search ............... 8/158, 159; 68/12.01, 68/12.18, 12.23, 12.27, 17 R, 27; 134/57 D, 58 D

[56] References Cited

U.S. PATENT DOCUMENTS

| | | | |
|---|---|---|---|
| 3,826,113 | 7/1974 | Boraas et al. | 68/17 R X |
| 4,404,625 | 9/1983 | Saito et al. | 68/12.23 X |
| 4,467,423 | 8/1984 | Smith et al. | 134/57 D X |
| 4,546,511 | 10/1985 | Kaufmann | 68/27 X |
| 4,845,965 | 7/1989 | Copeland et al. | 68/17 R |
| 4,867,193 | 9/1989 | Hayashi et al. | 68/17 R X |
| 4,922,566 | 5/1990 | Ravensbergen | 68/27 X |
| 4,932,227 | 6/1990 | Hogrefe | 68/12.18 X |
| 5,014,211 | 5/1991 | Turner et al. | 68/17 R X |
| 5,237,256 | 8/1993 | Bashark | 68/12.01 X |
| 5,272,892 | 12/1993 | Janutka et al. | 68/12.22 X |

FOREIGN PATENT DOCUMENTS

| | | | |
|---|---|---|---|
| 318997 | 12/1988 | Japan | 68/17 R |
| 23475 | 2/1993 | Japan | 68/12.01 |
| 673680 | 7/1979 | U.S.S.R. | 68/27 |

*Primary Examiner*—Philip R. Coe
*Attorney, Agent, or Firm*—Willie Krawitz

[57] ABSTRACT

A system is provided for managing washing machines, and controlling laundry chemical dispensers. The system enables a user to choose controls, such as: automatically select, change, increment and monitor formulations used in a specific washing machine, or in a group of machines; flush out chemicals to the washing machine in conjunction with a low level indicator; select a specific washing machine out of a group of machines for a different operation; a power reset following a spike detection, power surge or a brownout; readings for: hot and cold water consumption, drain output, and steam output; the use of a plurality of machines to perform a series of washings using a sequence of chemicals; and, print-out times, and dates associated with the operation of each machine in a series of machines. The control system is regulated by an input keyboard, and specific operations may be recorded by a printout, viewed on a screen, or both.

11 Claims, 5 Drawing Sheets

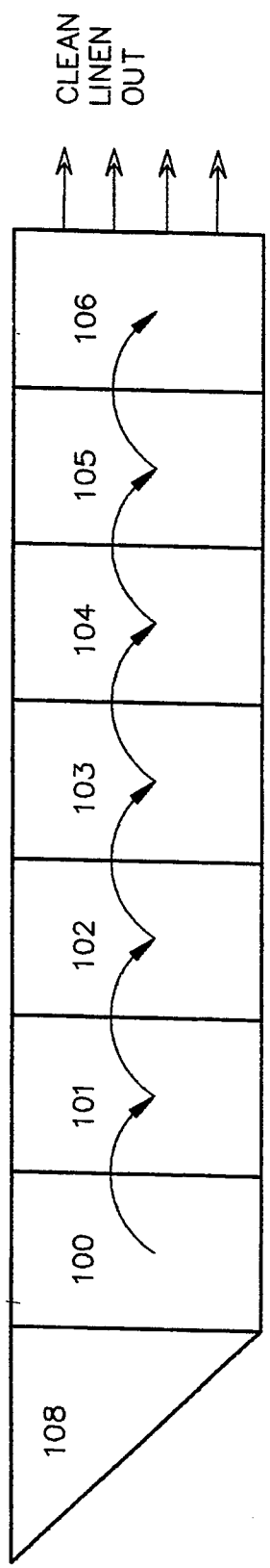

5,390,385

LAUNDRY MANAGEMENT SYSTEM FOR WASHING MACHINES

BACKGROUND OF THE INVENTION

This invention relates to a new and improved system for monitoring washing machines and controlling laundry chemical dispensers. The system also provides a print-out to pinpoint responsibility due to an accident, or to a system malfunction, or due to an error by the operator, as well as for routine record keeping of system operations.

Many washing machine facilities such as in hotels and motels, and in institutions such as hospitals, etc., employ numerous clothes washing machines in a single location, or the washing machines can be dispersed in various locations throughout the premises. In both cases washing machine personnel load the machines with clothes and fabrics, etc., fill the machines with cleaning chemicals, and then place the machines through a series of washing, rinse and spin cycles.

Various problems usually arise during operation of these washing machines, and these problems tend to fall into specific categories. For example, washing machine personnel may load a machine and select the wrong washing chemical. This may ruin the fabric and result in a claim against the washing machine owner. However, it becomes difficult to pinpoint responsibility for a washing machine defect, personnel error, or if the chemical employed was defective.

Occasionally, washing machine personnel incorrectly program a washing machine, but when the error is discovered, it could be too late to override or countermand the program, and consequently, the washing cycle may need to be reworked. It would be preferable to have the ability to override a program, and also to pinpoint responsibility for the error, since an incorrect or excessive washing could damage a fabric.

Other problems may arise due to power considerations such as a power failure, blown fuses, brownout, power surge, transient spikes, etc., which may cause the washing machine to malfunction, or to defeat an accurate supply of chemicals being fed to the system. The ability to accurately trace a malfunction can determine if an insurance claim can be made. Also, it would be desirable to provide a reset mechanism for the system, so that if a power malfunction occurs, a printout will indicate the time of malfunction and the time of reset.

Another problem which may arise is the accumulation of chemicals in supply lines to a washing machine, since they must be flushed out to prevent a toxic chemical buildup, injury to personnel and ensure clean lines for the next addition of chemicals, thereby preventing damage to clothes. Moreover, the supply lines suffer from chemical breakdown caused by chemicals which flow through them, which may cause clogging and breakage. The supply lines would last longer if the chemicals were flushed out on a regular basis.

Furthermore, monitoring of laundry operations in hospitals, hotels, restaurants, etc., can provide useful information concerning the effectiveness of a washing machine procedure in terms of chemicals employed, the duration of a particular washing operation, washing temperatures, etc., particularly where virus contamination may well be present.

Another consideration which may arise is to properly utilize the capability of a series of connected washing machines when performing a multi batch or tunnel washing operation while tracking and controlling the operation in terms of selecting the amount and types of chemicals used during a washing cycle of each washing machine in the multi batch operation.

Still another problem may arise due to a low level of chemical which will impair or defeat an adequate wash or cause serious damage to the washed material. It would be useful if the washing machine personnel and their employer were both able to pinpoint responsibility for this type of problem, since a wash material defect must be corrected by the company which sells or services the chemicals. Preferably, this type of problem should be printed out to record when a problem has arisen, and the steps taken (e.g., power reset) and time when the problem was corrected.

THE INVENTION

According to the invention, there is provided a system for monitoring washing machines and controlling laundry chemical dispensers, comprising programming input means and process display and/or printing means for monitoring, controlling, and recording the washing machine process.

The system and programs include functions for selecting, changing and monitoring different chemical formulations used in a washing machine or a series of washing machines; flushing chemicals from a machine; a low level alarm indicator; selecting a specific washing machine out of a group of washing machines for a different operation, a power reset following a spike detection, power surge or brownout; readings for: hot and cold water consumption, drain output and steam generation; the use of a plurality of machines to perform a series of washings using a sequence of chemicals; and, print-out times, and dates associated with operating one or more machines.

A keyboard is used to input programs and system functions to a laundry management computer, and the system operations may be recorded by a printout, viewed on a screen, or both.

BRIEF DESCRIPTION OF THE DRAWINGS

FIG. 4 is a schematic view of a series of washing machines employed in a tunnel washing facility;

FIG. 5 illustrates a program suitable for a tunnel or multi-batch washing operation; and, FIG. 6 is a system diagram showing the major electronic components of the washing machine system of this invention.

DESCRIPTION OF THE PREFERRED EMBODIMENTS

Figure 1:
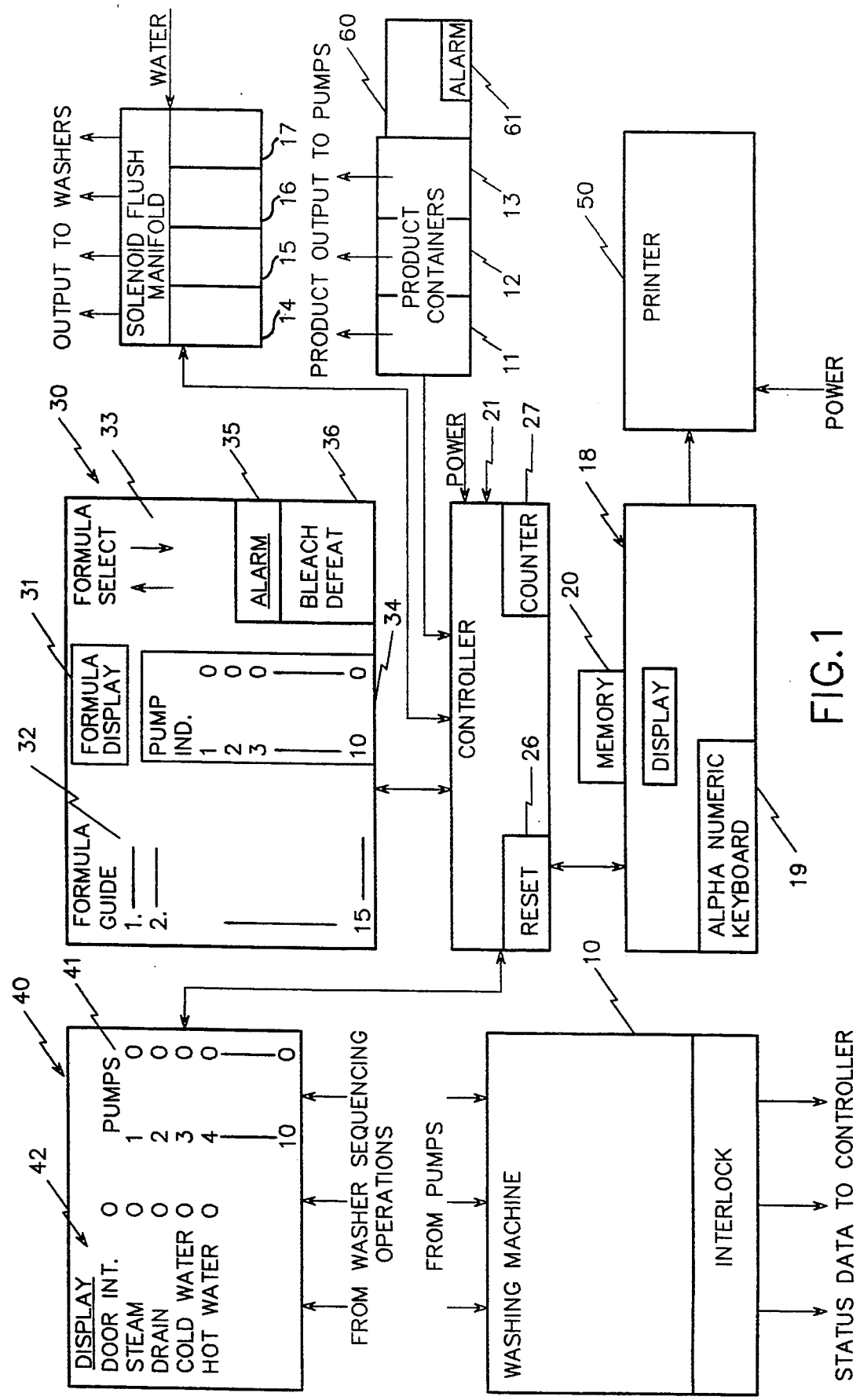
FIG. 1 is a system flow diagram showing the principal components of this invention; and, FIG. 2 is a program flow chart for the washing machine operation.

FIG. 1 illustrates the principal washing machine system components of this invention comprising a series of washing machines, one machine 10 being shown which includes a door interlock. The washing machine is fed from a plurality of chemical product containers 11, 12 and 13 such as various types of detergents, softeners, bleach, etc., by means of pumps 14, 15, 16, 17 such as peristaltic pumps, which include a solenoid flush manifold.

The system is programmed by a detachable, portable computer 18 with an alphanumeric keyboard input 19 and detachable memory 20; the computer is connected to the pumps through a controller board 21. The computer can monitor and program controllers which dispense laundry chemicals for both an individual washing machine and an entire system of washing machines, and this is far more efficient and less expensive than using an computer for separate washing machines at a single or separate sites.

Each computer is assigned an access code which is entered by the keyboard input 19 for programming a particular pump to feed a given formula to a specific washing machine. Moreover, in the absence of a specific code the computer cannot have its program changed by personnel in the field. Also, since the keyboard input 19 may be detached from the entire system, programs may be formulated in an area less noisy than the general area of washing machine operations, and at a more convenient time, then down loaded to a host controller board 21.

The controller board 21 is a memory which stores programs produced by an operator on keyboard 19, and also controls the chemical dispenser operations. The controller board also stores data generated by the washing machine operations, and can be interrogated by the computer 18 by means of the keyboard 19 for display or printing. Various components of the system are assigned an access code which is entered by keyboard input 19 for programming a particular pump to feed a given formula to a specific washing machine.

In addition to washing machine operating sequencing instructions, the controller 21 can feed multilevel instructions to the pumps, i.e., chemicals are fed to the washing machine at timed intervals, and flushed with water, rather than in a single batch. This enables the chemicals to be diluted, and hence will cause less damage to the clothes, compared to feeding the chemicals in a single concentrated batch to a washing machine.

Each of the pumps 14–17 can be programmed by an operator via the keyboard 19 and the controller board 21 to measure the actual time required to deliver a specific volume of chemical solution. By clocking the actual time required to measure delivery of a given volume of chemical on a pump by pump basis, and specific lengths of tubing, the program can be used to calibrate the system for volume output variability of the pump, the differing lengths of tubing, differing fluid viscosities of chemical solutions, etc.

The controller 21 is provided to receive and store programs from the computer, sequence system operations, and receive and store data from system operations for subsequent interrogation by the computer 18, via the keyboard 19. The controller may include a reset and start button 26 for the electrical system in the event of a power failure such as transmission spikes, blown fuses, power outage, power surges, brown-out, low level warning, etc. A counter 27 may also be included to record the number of washing machine cycles during a given period, thereby providing better system management. The counter 27 is mounted on the controller, usually in close proximity to the washing machine, so it can be readily accessed by an operator. However, signals from the counter may also be transmitted to the computer 18 which may be at a location remote from the washing machine. Optionally, the controller can be programmed by the computer to be signalled by the washing machine (via status signals) to automatically select the next chemical formula to be used. This allows the chemical formula selection to be automatic, without operator input. This will overcome the problem of an operator making an incorrect selection of chemicals which could cause the clothes to be damaged.

In conjunction with input from the computer 18, the controller can be programmed to cause multiple level formulae to be dispensed to the washing machines. Multiple level formulae permit a pump to automatically supply different amounts of a chemical formula to a washing machine, and this permits a chemical to be introduced at the right time and amount, thereby producing optimum was results without fabric damage.

Additionally, the controller 21 can be programmed to lock-out multiple signals from the washing machine to a pump in order to help prevent inadvertent chemical dispensing due to say, spurious signals.

The computer can program the controller to delay the pumping of chemicals to permit the washing machine time to fill so that the chemical is not applied to dry linen.

A module 30 is connected to the controller board, and provides a number display 31 for a specific formula currently in use; formula guides (1–15) 32; a formula select 33 which can be scrolled up or down; pump indicators 34 to display which pumps are in operation; an alarm indicator 35 for indicating specific problems; and, a bleach defeat button 36 to prevent bleach from being added to the wash. The formula guide 32 listed as 1–15 on module 30, enables a specific formula on the list to be double checked against the number display 31 by a washing machine operator, to ensure that a formula currently in use corresponds to the formula on the list. Formula select 33 also enables an operator to change a formula during a run if an incorrect formula has been sent to a washing machine. This is especially important if, for example, bleach has been added to a wash, and damage to clothes would result if the bleach was not neutralized or diluted.

A module 40 provides a pump actuation display 41 and a washing machine information display 42, including a door interlock display 43, hot water display 44, cold water display 45, steam display 46 and drain 47. Modules 30 and 40 can be detachable, and hence their uses is optional, depending on cost factors.

A printer 50 connected to computer 18 provides a recording of the chemical formulae used, the washing machine number, washing machine conditions such as time of usage, steam usage, drain volume, hot and cold water consumption, power malfunctions, cost of chemicals, maintenance schedules, accidental formula changes, formula change warnings, low level chemical supply warnings, and so forth. Maintenance schedules can become quite important if the pumps 14, 15, 16 and 17 are peristaltic pumps, since the rubber hosing used with these pumps becomes worn after a certain length of time. Replacement of the hosing can save considerable time and potential cost of lost washing chemicals, and improperly cleaned clothes.

An alarm housing 60 contains a low level alarm which monitors levels of chemical product in the product containers 11, 12 and 13, and a typical alarm is described in U.S. Pat. No. 5,059,954; an alarm signal is shown on display 61. It will be apparent that if the program provides a fixed weight of chemical ($W_1$, $W_2$, $W_3$) from each container, then the total weight possibilities are $W_1$, $W_2$, $W_3$, $W_1+W_2$, $W_1+W_3$; and, $W_2+W_3$. Using additional chemical feeds would provide even more leeway in the weight amounts of chemical employed, assuming a fixed feed time for the chemicals.

Figure 2:
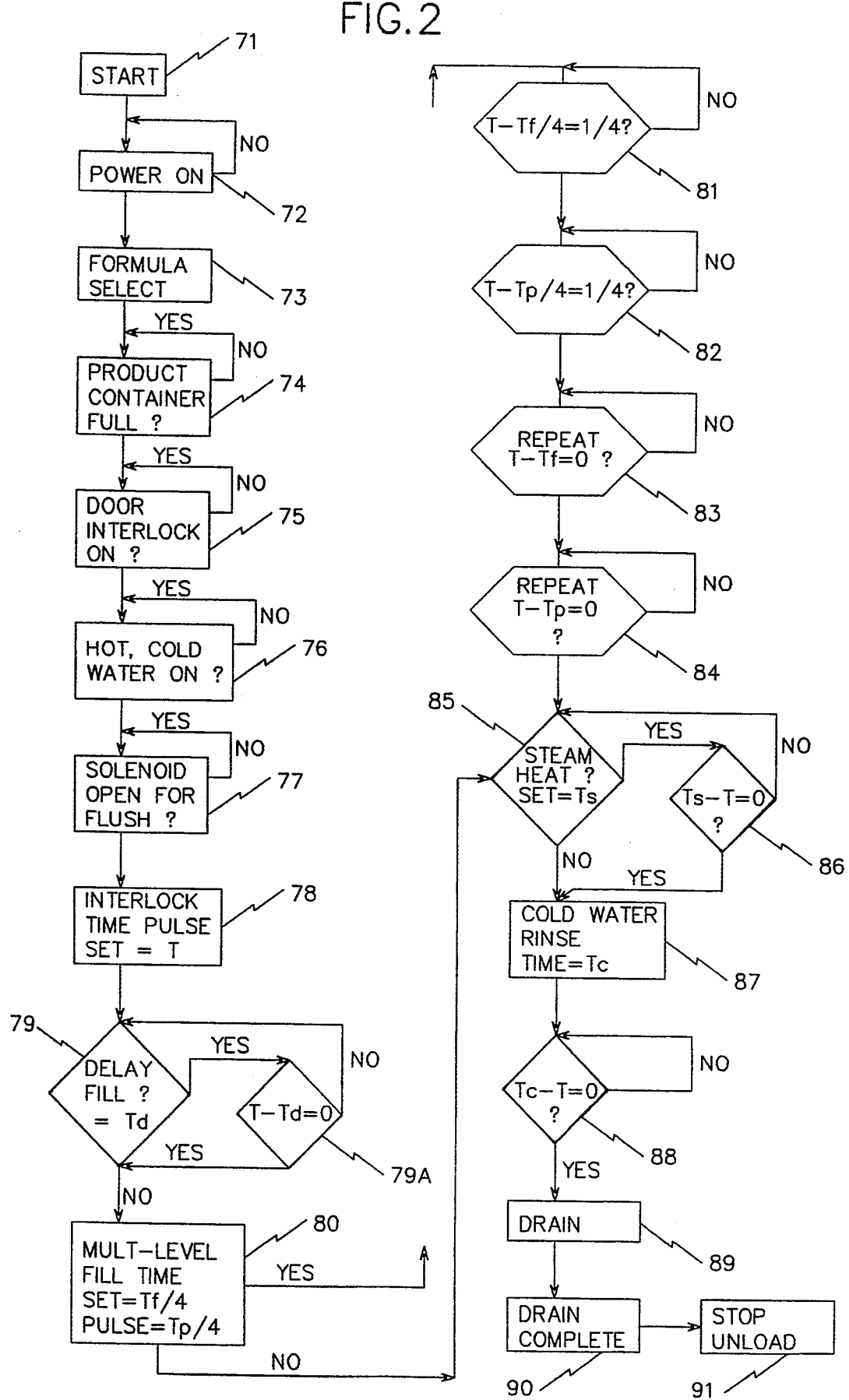
Figure 3:
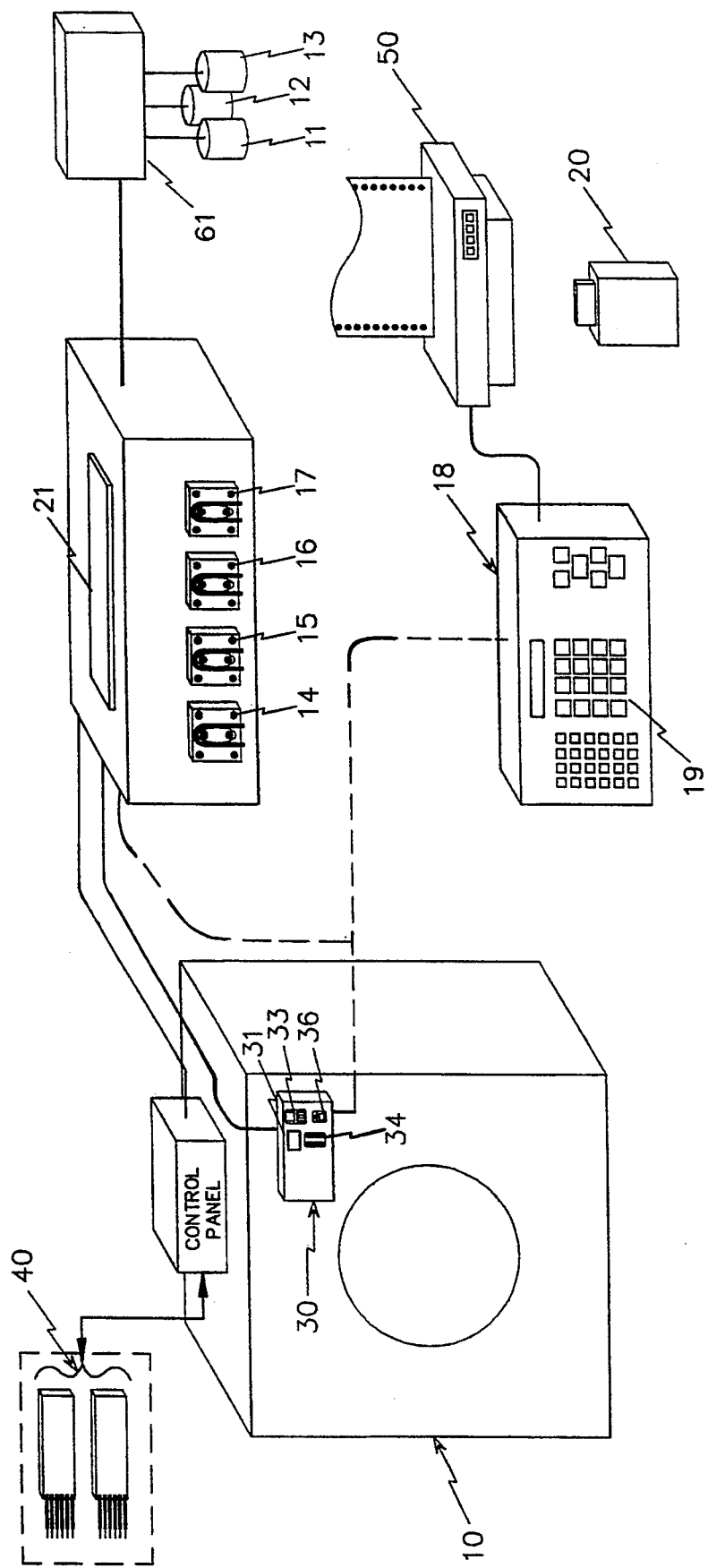
FIG. 3 is a view illustrating a layout of the system of this invention.

FIG. 2 shows a program which illustrates operation of the system. To start 71 the washing machine operation, the reset and start button 26 is pressed, and this turns on the power which is signalled by presence of various display lights. If no power is present 72, the program will idle until the condition is rectified and will then continue to the formula select 73 which requires the operator to select the formula to be used in the washing machine operation. Alternatively, the formula can be automatically selected using a program from the controller board 21, based on input from the computer 18. A fill check 74 is then made to determine if the containers 11, 12 and 13 have sufficient chemicals, and this condition is also cross checked by means of the alarm signal display 61. The program is halted if a low level signal is displayed, and once this condition has been satisfied, the program continues, and the door interlock on the washing machine is checked 75 to ensure it is closed.

Hot and/or cold water is turned on 76, and the washing machine solenoid is opened 77 for water to flush out the chemical delivery lines. An interlock start up time pulse ($=T$) is then set 78, and is based on predetermined flow rates of water and chemicals to the washing machine. Alternatively, a start up time pulse may be sent from the controller board, when all preliminary start up conditions have been satisfied. If a delay time ($=Td$) 79, is desired, water is first added to the washing machine 10, followed by feeding the chemical formula; otherwise, the main path of the program is followed. In 79A, a value for a delay time, Td is set, and subtracted from interlock pulse time, T. Continued decrement looping of $T-Td$ takes place based on time pulses from the controller until $T-Td=0$.

If a multilevel fill time 80 is desired, this entails adding multiple small fills of chemical, rather than single large addition of chemical to the wash, which could be deleterious to the clothes. Assuming four additions of chemicals at specific times Tf/4, at time intervals Tp/4, a decrement looping subtraction routine 81 is entered into, i.e., T-Tf/4, and decrement looping routine is continued until $T-Tf=\frac{1}{2}$. Similarly a time interval Tp/4 is set 82, and decrement looping is continued until $T-Tp/4=\frac{1}{2}$ has been satisfied, after which a second addition of chemical is made. The program repeats 83, 84 in this fashion until four loads of chemicals have been fed to the washing machine, until $T-Tf=0$, and $T-Tp=0$.

If steam heat is applied 85 for a time interval of Ts, a similar routine 86 of $T-Ts$ is made, and the program continues decrement looping until $T-Ts=0$. The program continues to a cold water rinse 87 for a time Tc, a looping operation 88 being made until $T-Tc=0$. The program then concludes with draining 89, and drain completion 90 (which is determined by level sensors, supra), and finally stopping the program 91 and unloading the wash. When the reset button 26 is pressed, the program sequence will automatically repeat unless changes are made, as previously indicated.

Tunnel washing is a well known technique of employing a series of washers to apply an individual washing steps to a batch of clothes to facilitate, in effect, a production line washing operation, and the control system of this invention is well suited for this type of a tunnel washing facility.

As shown in FIGS. 4 and 5, a series of washers 100, 101, 102, 103, 104, 105, and 106 are shown being fed dirty linen from an input 108. Assume pumps P1, P2, P3 and P4 are only being used on respective washers 100, 102, 103 and 106. Washers 102,105 and 106 will not require pumps since, in this case, they are not being fed chemicals, and are only being used for rinse purposes. Using a card reader or a keyboard input, as shown in FIG. 5, the first input to washer 100 would require 1 oz. of chemicals, while the remaining pumps and washers would not yet be operational since linen has not yet arrived at these stations. In the second sequence, a chemical application to washer 100 would again be 1 oz., while the remainder of the pumps would receive no chemicals since the load still had not yet arrived at the respective washers. In the third sequence, 1 oz. of chemical is fed to the washing machine 100, and 3 oz. of chemical is fed to the washing machine 103. Washing machines 103 and 106 would not receive any chemicals since the linens still had not arrived at these positions. As the program indicates, continued washing machine cycles will eventually feed the dirty linen forward and cause the chemicals to be fed to these latter two machines, 103 and 106. Thus, the system of this invention is well suited for application of tunnel washing procedures.

Figure 6:
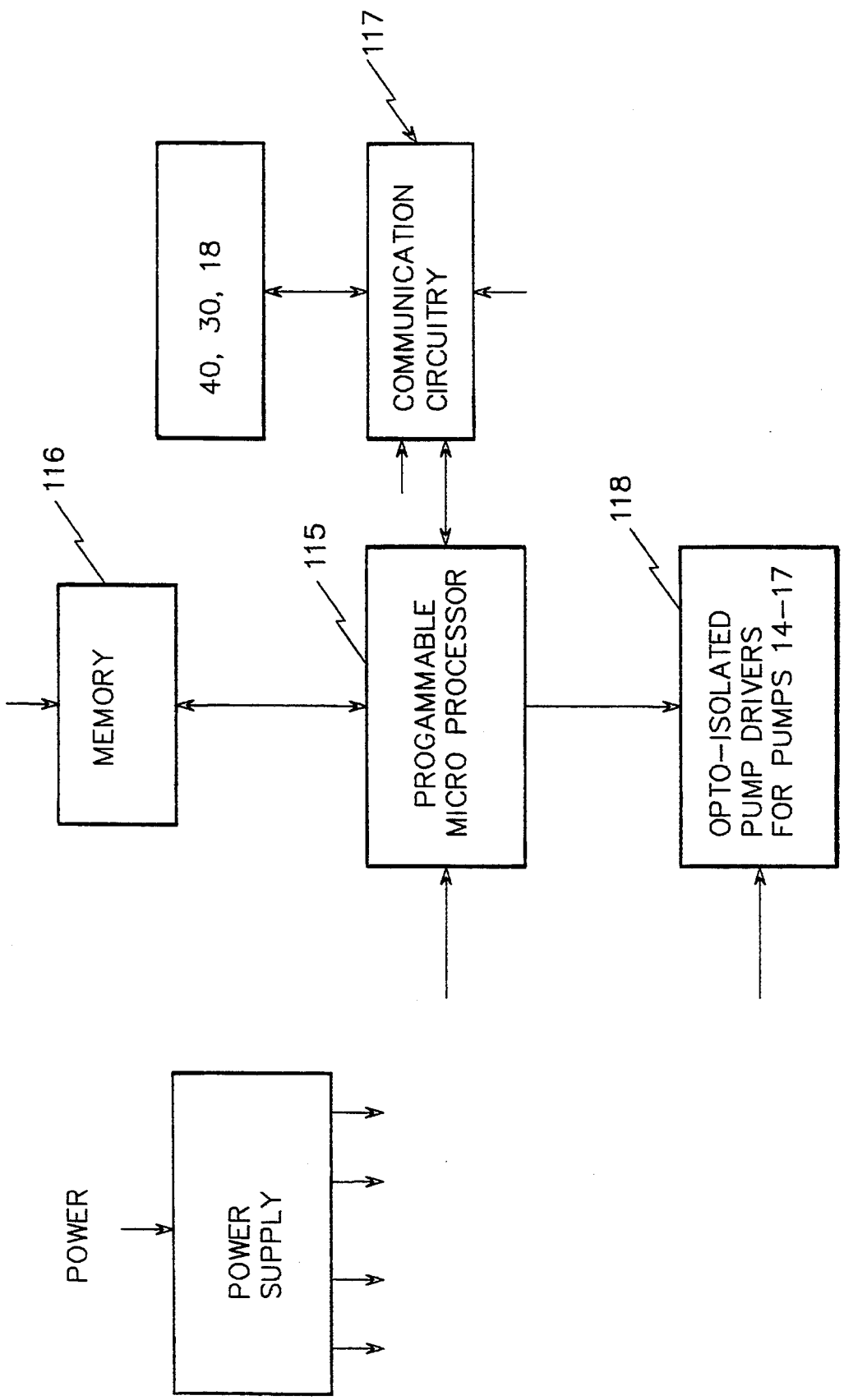

FIG. 6 shows the arrangement of the principal electronic components of the washing machine system of this invention. Programs and instructions from the portable computer 18 via the keyboard 19 are entered into the controller board 21, the programs and instructions being stored in a programmable microprocessor 115, and the data being stored in a memory 116 which has both volatile and non volatile components.

The microprocessor 115 transmits instructions to a communication system 117 which connects to the module 40 for sequencing and operating the washing machine 10. In addition, instructions from the microprocessor are fed to module 30 which receives status data from pumps 14–17 that are driven through opto isolators 118. The microprocessor 115 also transmits formula status and formula select instructions, and interchanges programs and data with the portable computer 18, as shown.

What is claimed is:

1. A process for monitoring and controlling washing machines and operations therefor, comprising:
   a.) controlling the washing machines with a controller board and an associated programmable microprocessor, using a program stored therein, the controller board being adapted to receive and store data and times corresponding to the washing machine operations;
   b.) formulating and revising the program by means of a computer, including a memory and an associated input keyboard connected to the computer, the computer being adapted to feed the programs, and revisions thereto the controller board;
   c.) interrogating the controller board for data from the washing machine operation contained therein, the computer and keyboard being detachably mounted to the controller board and to output means comprising a printer or display means connected to the computer;
   d.) automatically selecting the appropriate chemical dispensing formulae stored in the controller board via formula select status signals from the washing machine at the commencement of each new wash load cycle; and, e.) feeding chemical formulae from chemical containers to pumps connected to the washing machines, the pumps being adapted to receive pumping instructions from the controller, and to transmit pumping operations data to the controller board.

2. The process of claim 1, comprising printing out a time associated with a given washing machine function.

3. The process of claim 1, comprising indicating on detachable display means connected to the washing machine, the operational status of the pumps and, the status of washing machine components including: door interlock operation, the use of steam, drain, and hot and cold water, the display means being connected to the controller board for providing data thereto.

4. The process of claim 1, comprising indicating on detachable display means connected to the controller board the said display means being adapted to feed operational data to the pumps, including: formula number display, formula guides, formula select and display, pump displays for indicating which pumps are in operation, and a bleach defeat control.

5. The process of claim 1, comprising setting a timing signal by washing machine door interlock means following closure of the washing machine, and prior to turning on the washing machine operations, the timing signal initiating commencement and duration times, including: water flush for chemical delivery times, hot and cold water flow times, chemical feed times, multi-level fill times, steam times and, cold water flush times.

6. The process of claim 1, comprising flushing water through chemical delivery lines from the containers of the chemicals by means of the pumps, thereby reducing or removing excess or residue chemicals from the delivery lines connecting the pumps and the washing machines.

7. The process of claim 1, comprising actuating the flush means by means of a solenoid, the flush means including a manifold for receiving the flushing water.

8. The process of claim 1, comprising providing timing pulses from the controller board to determine the volume of chemical fed to a specific washing machine through a specific delivery line by a specific pump, thereby enabling an output flow calibration for the system.

9. The process of claim 1, in which the washing machines and operations comprise tunnel washing operation.

10. The process of claim 1, including multi-level filling of formulae components, comprising adding multiple small fills of formulae at timed intervals during a washing machine operation, thereby reducing the possibility of deleteriously affecting laundry contained in the washing machine due to sudden contact with large amounts of chemicals.

11. The process of claim 1, in which the chemical dispensing formulae are stored in the computer.

* * * * *